(12) United States Patent
Moreira et al.

(10) Patent No.: US 11,755,320 B2
(45) Date of Patent: *Sep. 12, 2023

(54) COMPUTE ARRAY OF A PROCESSOR WITH MIXED-PRECISION NUMERICAL LINEAR ALGEBRA SUPPORT

(71) Applicant: International Business Machines Corporation, Armonk, NY (US)

(72) Inventors: Jose E. Moreira, Irvington, NY (US); Brett Olsson, Cary, NC (US); Brian W. Thompto, Austin, TX (US); Silvia Melitta Mueller, Altdorf (DE); Andreas Wagner, Weil im Schönbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/480,279

(22) Filed: Sep. 21, 2021

(65) Prior Publication Data

US 2022/0004386 A1 Jan. 6, 2022

Related U.S. Application Data

(63) Continuation of application No. 16/712,087, filed on Dec. 12, 2019, now Pat. No. 11,188,328.

(51) Int. Cl.
*G06F 9/38* (2018.01)
*G06F 9/30* (2018.01)
*G06F 17/16* (2006.01)

(52) U.S. Cl.
CPC ...... *G06F 9/30014* (2013.01); *G06F 9/30145* (2013.01); *G06F 9/3855* (2013.01); *G06F 9/3893* (2013.01); *G06F 17/16* (2013.01)

(58) Field of Classification Search
CPC ............ G06F 9/30014; G06F 9/30036; G06F 9/3893; G06F 17/16
(Continued)

(56) References Cited

U.S. PATENT DOCUMENTS 10,242,423 B2   3/2019  Ould-Ahmed-Vall et al.
2018/0322607 A1 11/2018 Mellempudi et al.
(Continued)

FOREIGN PATENT DOCUMENTS

WO    2015004421 A1    1/2015

OTHER PUBLICATIONS

Buttari, A. et al. (Sep. 2007). Mixed precision iterative refinement techniques for the solution of dense linear systems, International Journal of High Performance Computing Applications, 16 pages.
(Continued)

*Primary Examiner* — Tan V Mai
(74) *Attorney, Agent, or Firm* — Cantor Colburn LLP; Nicholas Welling (57) ABSTRACT

Aspects include a compute array of a processor with mixed-precision numerical linear algebra support. A first precision and a first shape of a first input matrix and a second precision and a second shape of a second input matrix to the compute array are determined. A plurality of linear algebra operations is repeated in parallel within the compute array to update a result matrix in an accumulator register based on the first input matrix, the second input matrix, and a number of rank updates of the result matrix to store in the accumulator register.

20 Claims, 6 Drawing Sheets

(58) Field of Classification Search
USPC .......................................................... 712/205
See application file for complete search history.

(56) References Cited

U.S. PATENT DOCUMENTS

| | | |
|---|---|---|
| 2019/0066257 A1 | 2/2019 | Daga et al. |
| 2020/0311041 A1 | 10/2020 | Surti et al. |
| 2021/0182060 A1 | 6/2021 | Moreira et al. |

OTHER PUBLICATIONS

Clark, M. A. et al. (Dec. 2009). Solving lattice QCD systems of equations using mixed precision solvers on GPUs Computer Physics Communications, 181, 1517-1528. Retrieved from https://arxiv.org/abs/0911.3191, 30 pages.

Iakymchuk, R. et al. (Jan. 2015). Reproducible and accurate matrix multiplication for GPU accelerators. Hal-01102877. Retrieved from https://hal.archives-ouvertes.fr/hal-01102877/document, 12 pages.

Kurzak, J., & Dongarra, J. (Jan. 2007). Implementation of mixed precision in solving systems of linear equations on the cell processor. Concurrency and Computation: Practice and Experience, 19(10), pp. 1371-1385. doi: 10.1002/cpe.1164.

List of IBM Patents or Patent Applications Treated as Related; Date Filed: Sep. 21, 2021, 2 pages.

COMPUTE ARRAY OF A PROCESSOR WITH MIXED-PRECISION NUMERICAL LINEAR ALGEBRA SUPPORT

BACKGROUND

The present invention relates to computer systems, and more particularly, to a compute array of a processor with mixed-precision numerical linear algebra support.

Numerical support within a processor can include mathematical operations to increase computational efficiency and throughput. Some mathematical operation instructions implemented within a processor can include combined operations, such as multiply-and-accumulate (MAC) operations. MAC operations can be performed on scalars, vectors or matrices. Matrix math can be resource intensive and is often implemented using higher-level routines which take many cycles to execute. Further, matrix math routines may use many MAC operations and be constrained to fixed precision computations. If inputs to a matrix math operation have a different precision than the result, additional rescaling operations may be needed, which can further reduce computational efficiency and throughput.

SUMMARY

According to one or more embodiments of the present invention, a computer-implemented method includes determining a first precision and a first shape of a first input matrix to a compute array of a processor and determining a second precision and a second shape of a second input matrix to the compute array of the processor. A plurality of linear algebra operations is repeated in parallel within the compute array to update a result matrix in an accumulator register based on the first input matrix, the second input matrix, and a number of rank updates of the result matrix to store in the accumulator register.

Other embodiments of the invention implement the features of the above-described method in a system and in a computer program product.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular various aspects of computing systems and specific computer programs to implement the various technical features described herein are well known. Accordingly, in the interest of brevity, many conventional implementation details are only mentioned briefly herein or are omitted entirely without providing the well-known system and/or process details.

Embodiments of the invention can include one or more compute arrays in a processor, where each compute array includes a plurality of compute elements configured to perform one or more multiply-and-accumulate (MAC) operations. Collectively, the compute elements can perform a plurality of linear algebra operations in parallel. The linear algebra operations can include matrix MAC operations that multiply two matrices and accumulate the results. The linear algebra operations can be performed for many purposes, such as machine learning, image processing, and other technical applications. By increasing the efficiency of linear algebra operations and supporting mixed-precision operations, exemplary embodiments can result in improved processing system performance and flexibility to cover a wider range of mathematical operations within hardware rather than relying upon more high-level routines executing with greater processing overhead.

As one example, a compute array of exemplary embodiments can compute a matrix MAC operation, such as multiplying a first input matrix (A) with a second input matrix (B) and accumulating the result in a result matrix (C), as illustrated by the following equation (1):

$$C_{ij} = \Sigma A_{ik} * B_{kj} \quad \text{Equation (1)}$$

In the above equation (1), the subset of MAC operations may include the sum of products $\Sigma(A_{ik}*B_{kj})$, for a given value of k. For example, if A, B, and C are 4×4 matrices, a subset of MAC operations may comprise 4 MAC operations A11*B11, A12*B21, A13*B31, and A14*B41 for obtaining element C11. Each group of one or more MAC operations that can be performed by a compute element, in one clock cycle, may be performed by executing a processor instruction. The processor instruction may, for example, be executed in parallel by multiple compute elements in a compute array. For example, the set of MAC operations can include N MAC operations to be performed by one compute array of compute elements and other N MAC operations to be performed by another compute array of compute elements. The two compute arrays may be configured to consecutively perform each pair of MAC operations in parallel (e.g., if N=3, 3 pairs of MAC operations may consecutively be performed in parallel). This may particularly be advantageous if each compute element includes a single accumulator that is used to store one element. The accumulator may be a register. In another example, the accumulator may include multiple fields or accumulator elements (e.g., m elements), where each accumulator element may be used to accumulate results of respective MAC operations. In this case, the compute array may be configured to perform m MAC operations in parallel in one clock cycle.

If more than one accumulator exists in each compute array, a pipelined execution of the instructions may be used. According to an embodiment, each compute element of the compute array can be configured to perform a respective MAC operation in at least one clock cycle. The MAC operation execution may, for example, include four clock cycles to generate the result of the processor instruction. The processor instruction may include four steps, where each step contributes to obtain the overall result of the processor instruction being processed. In a sequence of clock cycles, a new processor instruction may be started using a different accumulator register. As soon as the result of the instruction is available, e.g., after 4 cycles, the accumulator used by the first instruction can be used again by a subsequent instruction. According to an embodiment, the processor instructions can be decoded in one clock cycle.

According to an embodiment, an index used for the computations can be an architected accumulator register index of the accumulator of a compute array. This may save processing resources because the same index can be used to index both the accumulator and the compute array that comprises the accumulator. This is by contrast to another implementation that would require separate indexing of the compute array and the accumulators.

According to an embodiment, a processor can include a dispatch and/or issue unit. The dispatch and/or issue unit can be configured to process multiple processor instructions, select compute arrays using the index and send the processor instructions to the selected compute arrays for performing a set of MAC operations or other such linear algebra operations. This may enable a seamless integration in existing systems by making minimal changes to existing dispatch and/or issue units.

According to an embodiment, each processor instruction can include operands indicating the accumulator as a source and target register of the instruction and indicating further registers, of the other register file, including source data to be multiplied and accumulated. The source data can include numbers to be operated upon. Using the accumulator as a source and target register can enable a resource saving access to data. This is by contrast to a compute array using two separate accumulators, one for writing and one for reading data, which may introduce extra latencies and additional source-target dependency tracking logic. Due to the reduced connectivity in a processor unit using a single accumulator (e.g., by placing a single accumulator near the execution unit), the single accumulator can be accessed multiple times faster than accessing separate accumulators.

According to an embodiment, compute arrays can be part of the dispatch and/or issue unit. This may save area on a chip and power compared to a separate implementation of the compute arrays. For example, in case the compute arrays are implemented as separate components of the dispatch and/or issue unit, the compute arrays may occupy more space and may use extra power sources.

Figure 1:
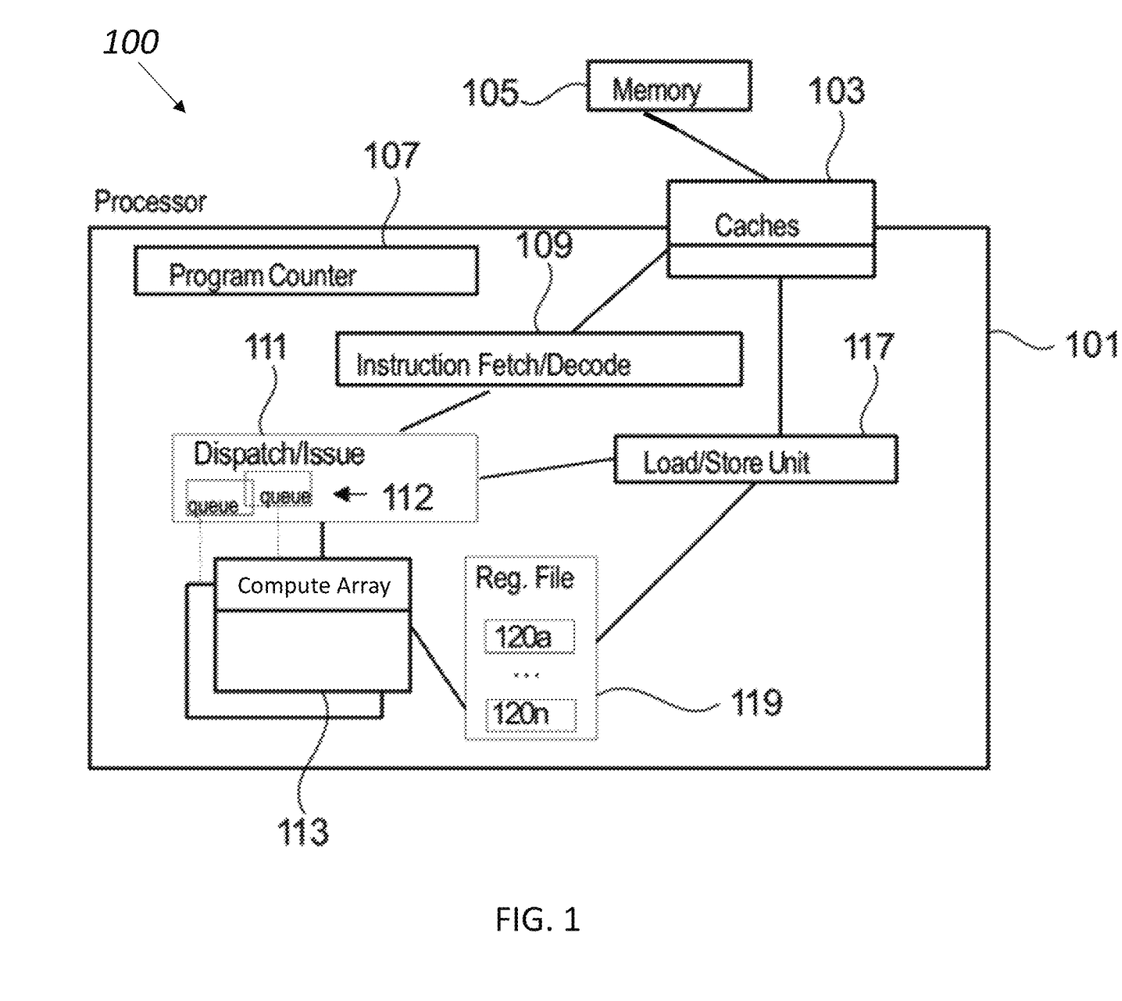
FIG. 1 is a block diagram illustrating a computer system in accordance with various embodiments of the invention.

Referring to FIG. 1, a block diagram illustrating a structure of a processing system 100 including processor 101 is depicted in accordance with an embodiment. The processing system 100 may enable storing data for performing operations on the stored data. According to an embodiment, one or more levels of a cache 103 of the processing system 100 may be employed to buffer memory data in order to improve processor performance. The cache 103 may include a high-speed buffer holding cache lines of memory data that are likely to be used. For example, typical cache lines may include 64, 128, or 256 bytes of memory data. According to an embodiment, the cache 103 may be configured to cache data of higher hierarchical storage, such as a main memory storage 105.

According to an embodiment, the processor 101 may further include a register file 119 with registers 120*a-n*. The registers 120*a-n* may, for example, include general-purpose registers that each includes a number of bits to store data items processed by instructions executed in the processor 101.

According to an embodiment, the instructions may be provided by a compiler. For example, source code of a program may be compiled into a series of machine-executable instructions defined in an instruction set architecture ("ISA") associated with the processing system 100. The ISA may include at least one processor instruction defined in accordance with at least one embodiment of the present disclosure. The instructions of the ISA may be provided to process data stored in memory 105 and/or in the registers 120*a-n* of the register file 119 of the processor 101. According to one embodiment, when the processor 101 starts to execute the executable instructions, these machine-executable instructions may be placed in order to be executed sequentially.

According to an embodiment, an instruction fetch/decode unit 109 may be employed to fetch placed instructions. For example, the instruction fetch/decode unit 109 may fetch the next sequential instructions, the target instructions of branch taken instructions, or the first instructions of a program following a context switch. The fetched instructions may be decoded by the instruction fetch/decode unit 109.

According to an embodiment, the decoded instruction(s) may be passed to a dispatch/issue unit 111. The dispatch/issue unit 111 may deposit the instructions in one or more issue queues 112, where the instructions may wait for source operands and an appropriate compute array 113 of the processor 101 to become available. For example, each compute array 113 of the compute arrays 113 may be associated with an issue queue 112 such that instructions to be executed by the compute array 113 may be queued in the issue queue 112 associated with the compute array 113. The dispatch/issue unit 111 may deposit the instructions in an issue queue 112 based on an index that is assigned to the compute array 113 of the issue queue 112. This index may be part of the instructions. That is, by reading the index from an instruction, the dispatch/issue unit 111 may know (e.g., determine) which compute array 113 can execute the instruction. Each compute array 113 of the compute arrays 113 may be configured to execute one respective type of instruction which may not be executed by other compute arrays 113. In one embodiment, a type of an instruction may be defined by the registers associated with the instruction.

In conventional methods, every execution unit may be implemented to execute every instruction (e.g., any instruction can go to any execution unit). However, the conventional methods may be more expensive in terms of processing resources.

According to an embodiment, each issue queue 112 may include window logic which may be responsible for monitoring dependencies between instructions in the queue and issuing instructions to the respective compute array 113. The window logic may include wakeup logic and select logic. The wakeup logic may be responsible for invoking instructions waiting in the issue queue 112 for the source operands to become available. Once all the source operands of an instruction are available, the instruction may be flagged ready for execution. The select logic may be responsible for selecting instructions for execution from the pool of ready instructions. An instruction may be ready if all of its source operands are available. Then the operand values of the instruction may be loaded from the memory 105 and/or registers using a load/store unit 117.

A compute array 113 may receive information about instructions from the dispatch/issue unit 111 and may perform operations on operands according to the operation code of the instruction. Operands are provided to the compute array 113 from registers in accordance with the present disclosure. Results of the execution, when stored, may be stored either in memory 105 and/or registers 119. According to an embodiment, each compute array 113 may include multiple compute elements with at least one multiplier and at least one adder. Each multiplier of the compute array 113 may be configured to perform the product of two numbers and the adder may be configured to add the product to the content of an accumulator associated with the multiplier or to a content of an accumulator element associated with the multiplier. The compute array 113 may be configured to perform multiple MAC operations in parallel in at least one clock cycle. In one example, the compute array 113 may include an X number of multipliers that may enable the compute array 113 to perform an X number of MAC operations or other linear algebra operations in at least one clock cycle.

According to an embodiment, a program counter (instruction counter) 107 may keep track of the address of the current instruction to be executed. For example, a program counter 107 in processor, such as, a z/Architecture® (z/Architecture and all IBM-based trademarks and logos are trademarks or registered trademarks of International Business Machines Corporation and/or its affiliates) processor may include 64 bits and may be truncated to 31 or 24 bits to support prior addressing limits. A program counter 107 may be embodied in a program status word ("PSW") of a computer such that it persists during context switching. In an embodiment, the program counter may be incremented by an amount equal to the number of bytes of the current instruction.

The processing system 100 may be configured to perform a pipelined execution of the instructions. For example, a four-cycle latency pipelined execution may be used by each compute array 113 of the processor 101 such that each instruction may take the compute array 113 four clock cycles to produce the result of the linear algebra operations. For that, the execution of the instruction at the compute array 113 may be broken down into four processes, where one of the four processes may include a multiplication process and another of the four processes may include the accumulation process.

According to one embodiment, the processing system 100 may be configured to operate in an ST mode, an SMT2 mode, or an SMT4 mode. In ST mode, MAC operations from one thread may be performed or handled at a time by the compute arrays 113. For example, in the ST mode, each of the compute arrays 113 may be configured so that the compute arrays 113 receive instructions from one specific thread (e.g., T0). In SMT2 mode, the compute arrays 113 may receive instructions from any one of two threads. For example, in the SMT2 mode, each of the compute arrays 113 may be configured so that the compute arrays 113 receive instructions from thread T0 and/or thread T1. In SMT4 mode, each compute array 113 may receive processor instructions from all four threads (e.g., T0, T1, T2 and T3) or the compute array 113 may operate in a split mode to receive two threads. For example, in split mode, if the processing system 100 includes two compute arrays 113, one compute array 113 may be configured to process instructions from thread T0 and/or thread T2 and the other compute array 113 may be configured to process instructions from thread T1 and/or thread T3.

Thus, the processing system 100 may enable processing instructions from one or more programs using compute arrays 113. For example, the source code of a program may implement one or more MAC operations. A MAC operation may include multiplying two numbers and adding the result of the multiplication to an accumulated value. At least one MAC operation may be performed by the compute array 113 by executing a respective processor instruction of the ISA.

Figure 2:
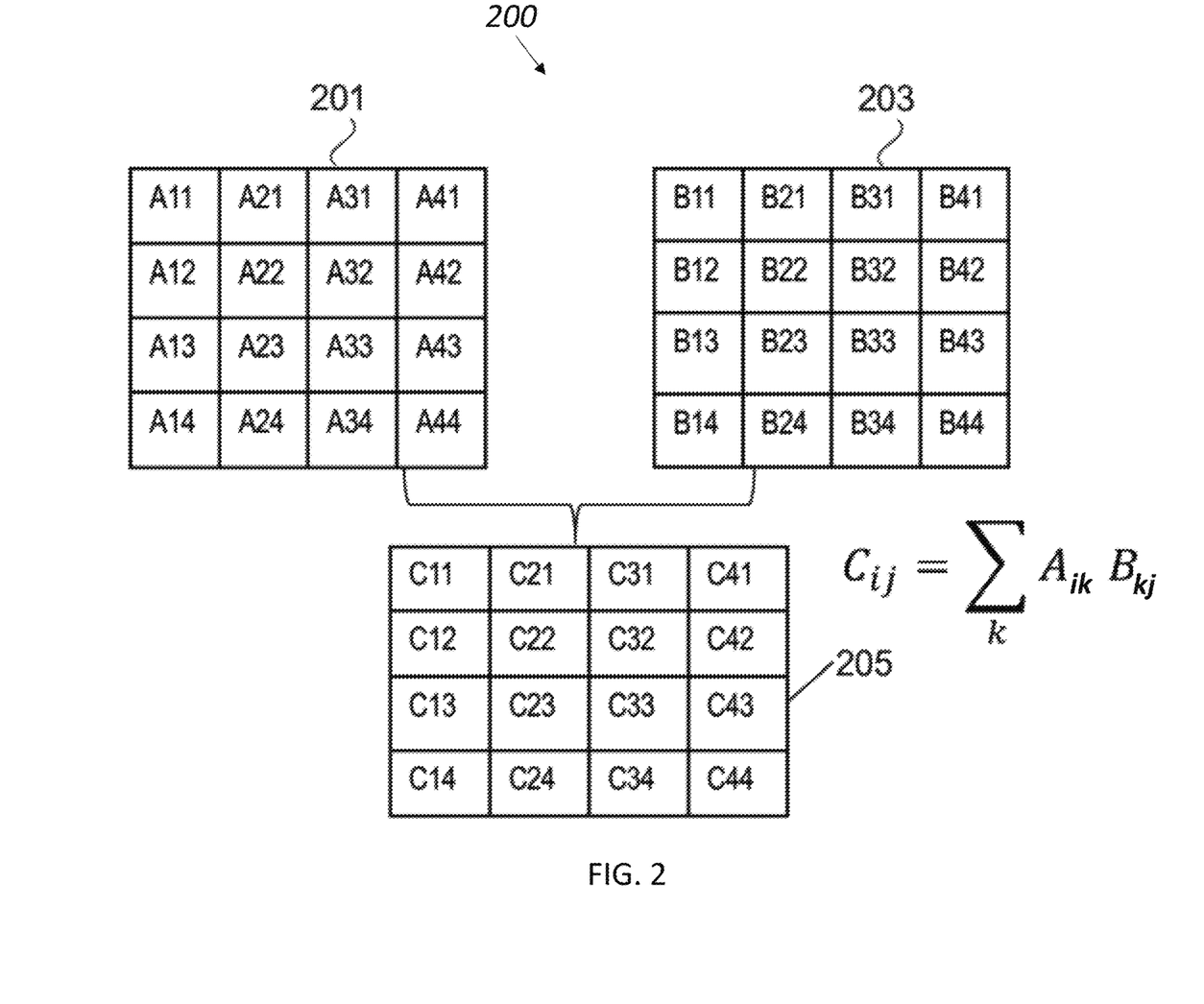
FIG. 2 is a block diagram illustrating an exemplary matrix operation according to a non-limiting embodiment.

According to one embodiment, the matrix operation 200 of FIG. 2 may be referred to as a matrix multiply and accumulate ("MMA") operation. The matrix operation 200 may multiply a first input matrix 201 by a second input matrix 203, and the accumulated result may include a result matrix 205. If the first input matrix 201 includes an M-by-K matrix as a first shape and the second input matrix 203 includes a K-by-N matrix as a second shape, then the result matrix 205 may include an M-by-N matrix as a result shape. Thus, each element of the result matrix 205 may be obtained by K MAC operations. As shown in FIG. 2, the first input matrix 201 may include a 4×4 matrix and the second input matrix 203 may include a 4×4 matrix. According to an embodiment, the matrix operations may not be limited to the dimensions illustrated in FIG. 2, which are provided as examples. As used herein, the term "shape" may be used to define matrix dimensions. The term "precision" may be used to define a number of bits included in each element, such as 4-bits, 8-bits, 16-bits, 32-bits, 64-bits, etc. Further, computations can be performed using fixed-point or floating-point formats.

One or more accumulators may be used for computing the MAC operations and storing elements of the result matrix 205. An accumulator may have an accumulator size, e.g., 512 bits, indicating a predetermined size of the accumulator. An accumulator may include multiple accumulator elements or fields. An accumulator element may have an accumulator element size which may be smaller than the accumulator size, e.g., an accumulator element size may be 32 bits. Each accumulator element of the accumulator may have or occupy respective number of bits of the accumulator, e.g., a first accumulator element may occupy bits 0 to 31 of the accumulator, the second accumulator element may occupy bits 32 to 63, and the sixteenth accumulator element may occupy the bits 480 to 511. In an embodiment, the accumulator element size may be defined as the size of an element of the result matrix 205. This may be advantageous as the accumulator may be configured to include as many accumulator elements as the number of elements in the result matrix 205. This may enable storing all elements of the result matrix 205 in one accumulator.

Figure 3:
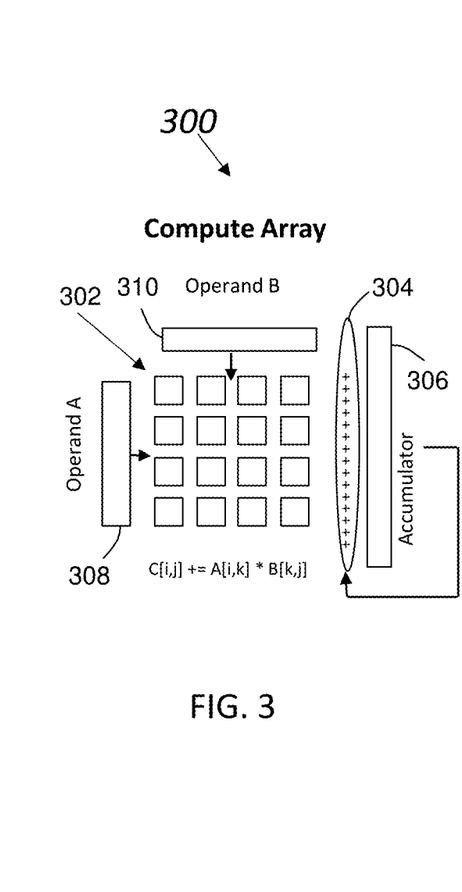
FIG. 3 is a block diagram of a compute array according to a non-limiting embodiment.

FIG. 3 depicts an example of a compute array 300 suitable for performing the matrix operation 200 of FIG. 2. According to an embodiment, the compute array 300 includes a plurality of compute elements 302, an adder 304, and an accumulator register 306 configured to perform a plurality of linear algebra operations on a first operand 308 and a second operand 310. The first operand 308 can hold a portion of the first input matrix 201 of FIG. 2, and the second operand 310 can hold a portion of the second input matrix 203 of FIG. 2. In the example of FIG. 3, the compute array 300 includes sixteen compute elements, where a first plurality of lanes (e.g., four lanes) of compute elements 302 and a second plurality of lanes (e.g., four lanes) of compute elements 302 form a two-dimensional grid structure of four rows and four columns of compute elements 302. Each element of the result matrix 205 of FIG. 2 may be stored in a respective accumulator element of the accumulator register 306. An accumulator element of the accumulator register 306 may be referred to as $ACC_j(0)$, where j=1, ..., 16. Element C11 of the result matrix 205 may be stored in an accumulator element ACC1(0) having bits 0 to 31 of the accumulator ACC(0), C21 may be stored in an accumulator element ACC2(0) having bits 32 to 63 of the accumulator ACC(0), C31 may be stored in an accumulator element ACC3(0) having bits 64 to 95 of the accumulator ACC(0), C41 may be stored in an accumulator element ACC4(0) having bits 96 to 127 of the accumulator ACC(0) and so on. Accordingly, the storage of 16 times a 32-bit element may result in using the full width of 512 bits of the accumulator register 306.

Before computing the elements of the result matrix 205, each accumulator element $ACC_j(0)$ of the accumulator ACC(0) may be initialized with (or store) an initial value. The initial value may, for example, be zero. In another example, the element $ACC_j(0)$ may be initialized by other values such as a pre-computed portion of a matrix element (e.g., for obtaining C11, the accumulator element ACC1(0) may be initialized with the value of A11*B11). In another example, the initialization may be performed by a first instruction that may differ from a MAC operation instruction, such that the multiplication result may be stored in the accumulator element of the accumulator ACC(0) without using the accumulator ACC(0) as an input. As an example, the K dimension of the first input matrix 201 can be used as an outmost loop of programing loops used for computing an outer product. The MMA operation may load a column of the first input matrix 201 and a row of second input matrix 203 once as operands 308, 310 from a register file, in order to compute its outer product, and accumulate the result of this outer product as an element in the result matrix 205. Afterward, this column of the first input matrix 201 and row of the second input matrix 203 may not be used again.

For example, in obtaining each element of the 16 elements C11 to C44 of the result matrix 205, four MAC operations may be performed using a respective accumulator element. In order to obtain the element C11, the MAC operations may be performed using the content of the accumulator element ACC1(0).

Based on the structure of the result matrix 205 and the MMA operation, the compute elements 302 may be configured to perform the MMA operation in an optimal way. For example, the MMA operation may be split into sets of MAC operations so that each set of MAC operations may be performed in one clock cycle by the compute elements 302. Following the example of FIG. 2, the matrix operation 200 may involve four sets of MAC operations that each can be processed in one clock cycle by the compute array 300. Each MAC operation can involve the multiplication and the addition of the result of the multiplication to the content of a respective accumulator element. The execution of each set of the four sets of MAC operations may be performed by issuing a respective instruction, such as, for example, an integer-based instruction. The accumulator element used by each MAC operation of a set of MAC operations may be indicated in the instruction. For example, an accumulator element used by each MAC operation of a set of MAC operations may be determined by the instruction type (e.g., the instruction may have different types, wherein each type may be used for different numbers of MAC operations with differing shapes and precisions). The instruction name can be associated with a number of accumulator elements and data types in the operands 308, 310 as well as the accumulator register 306.

In the first MAC operation of the set of 16 MAC operations, the product A11*B11 may be performed and the result of the product may be added to the content of the first accumulator element ACC1(0) having bits 0 to 31 of the accumulator ACC(0) which may be zero. Thus, after the first MAC operation, the first accumulator element ACC1(0) may contain the product A11*B11. In the second MAC operation of the set of 16 MAC operations, the product A11*B12 may be performed and the result of the product may be added to the content of the second accumulator element ACC2(0) of the accumulator ACC(0) which may be zero. Thus, after performing the set of 16 MAC operations, each element ACCj(0) of the accumulator ACC(0) may include an intermediate value of a respective element of the result matrix 205. After completing the set of 16 MAC operations, another set of 16 MAC operations may be performed by the compute array 300. This repetition may be performed until all sets of MAC operations are performed.

In the case of a four-cycle pipelined execution, each MAC operation may be performed in four steps. Thus, each set of the 16 sets of MAC operations may be performed in four clock cycles. For example, the first step of each MAC operation of the set of MAC operations may be performed by the compute array 300 in one, same, clock cycle (e.g., all first steps of the set of MAC operations may be performed in one, same, clock cycle). The second step of each MAC operation of the set of MAC operations may be performed by the compute array 300 in another, same, clock cycle. The third step of each MAC operation of the set of MAC operations may be performed by the compute array 300 in another, same, clock cycle. The fourth step of each MAC operation of the set of MAC operations may be performed by the compute array 300 in another, same, clock cycle. The pipelined execution enables performing different steps of different sets of MAC operations during a same clock cycle.

The elements of each resulting matrix of the four resulting matrices of the four matrix operations may be stored in respective accumulators ACC(0), ACC(1), ACC(2), and ACC(3).

The example provided in FIGS. 2 and 3 illustrates the MAC computation for 32-bit elements as input sources. However, it is contemplated that other configurations, such as, for example, 16-bit, 8-bit, or 4-bit elements, may be handled in a similar way by multiplying and adding two pairs of 16-bits in the 32-bit wide accumulator elements or doing the MAC operation on four pairs of 8-bits to calculate the 32-bit wide accumulator fields during the four cycles execution. In a similar manner, the accumulator element size may be less or more as 32-bits as well as the number of elements stored into the accumulator register 306. In the 4×4 implementation example of FIG. 3, there can be 4×1, 32-bit first operand 308 (e.g., representing one column of the first input matrix 201) and a 1×4 32-bit second operand 310 (e.g., representing one row of the second input matrix 203) as inputs and the 512-bit accumulator register 306 illustrated at the output storing the sixteen 32-bit results of the result matrix 205. The linear algebra operations can include various computation algorithms, such as an outer product, an inner product, a dot product, and the like.

Figure 4:
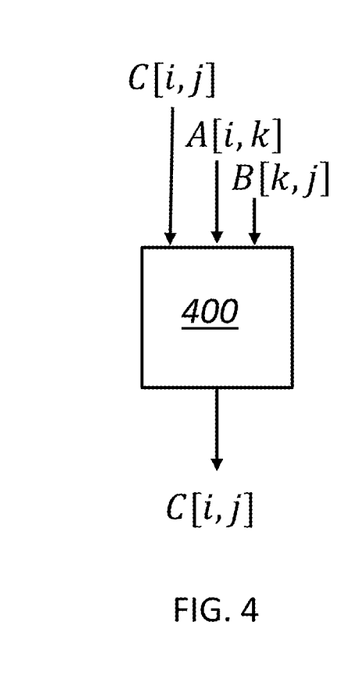
FIG. 4 is a block diagram of a compute element supporting single-precision computations according to a non-limiting embodiment.
Figure 5:
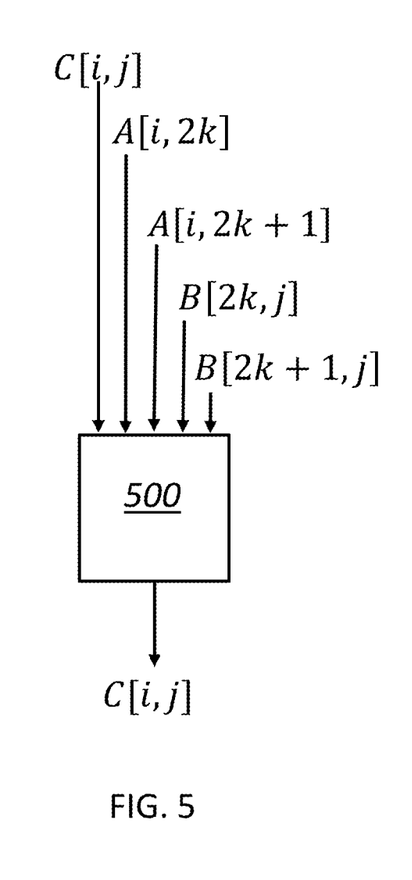
FIG. 5 is a block diagram of a compute element supporting mixed-precision computations according to a non-limiting embodiment.

FIGS. 4 and 5 depict various element mappings that can be supported based on different configurations of matrix shapes and precisions. Compute element 400 is an example of one of the compute elements 302 of FIG. 3 where input elements A[i,k] and B[k,j] have the same precision (i.e., number of bits) as the result element C[i,j], where compute element 400 computes C[i,j] as C[i,j]+A[i,k]*B[k,j]. Compute element 500 of FIG. 5 is an example where the precision of input elements A and B is half of the result element C, such as 16-bit inputs mapped to a 32-bit result. Half-precision inputs can enable operations on twice as many elements. Thus, in the 4×4 example, where a 4×1 column is multiplied by a 1×4 row, and the half-precision example of a 4×2 group is multiplied by a 2×4 group per rank-2 update. The compute element 500 can receive A[i,2k], A[i,2k+1], B[2k,j], and B[2k+1,j] as inputs along with C[i,j] to compute an updated result as C[i,j]. A similar pattern can be applied to use the same size operands 308, 310 to support reduced precision inputs, such as holding 4×4 8-bit elements or 4×8 4-bit elements as the precision drops to 8-bits or 4-bits. Notably, the change in precision results in a change of supported matrix shape per computation iteration of the compute array 300. Separate program instructions can be architected for the processor 101 of FIG. 1 to support floating-point and integer matrix multiplication operations, such as 4×1 32-bit values multiplied with 1×4 32-bit values and accumulated with a 4×4 32-bit result, 4×2 16-bit values multiplied with 2×4 16-bit values and accumulated with a 4×4 32-bit result, 4×4 8-bit values multiplied with 4×4 8-bit values with a 4×4 32-bit result, and 4×8 4-bit values multiplied and accumulated with 8×4 4-bit values and accumulated with a 4×4 32-bit result. Vector registers used to support the operations can have designated bit fields that define how a sequence of numbers is to be partitioned into rows and columns of a corresponding precision.

The resulting operations that can be performed by the compute array 300 may be $c_{ij} \leftarrow c_{ij} + a_i \times b_j$ for 32-bit inputs, $c_{ij} \leftarrow c_{ij} + a_{i0} \times b_{j0} + a_{i1} \times b_{j1}$ for 16-bit inputs, $c_{ij} \leftarrow c_{ij} + \Sigma_{k=0}^{3} a_{ik} \times b_{jk}$ for 8-bit inputs, and $c_{ij} \leftarrow c_{ij} + \Sigma_{k=0}^{7} a_{ik} \times b_{jk}$ for 4-bit inputs, as operations where the first operand 308 and the second operand 310 each hold 128 bits and the accumulator register 306 holds 512 bits. As the precision and shape of the inputs change, the size (e.g., number of bits) of each input can remain the same. Fundamental operations can change with the precision of the inputs, such as rank-1 for 32-bit elements, rank-2 for 16-bit elements, and rank-4 for 8-bit elements. The number of repetitions of the fundamental operation is adjusted accordingly with p repetitions for rank-1, p/2 repetitions for rank-2, and p/4 repetitions for rank-4.

Figure 6:
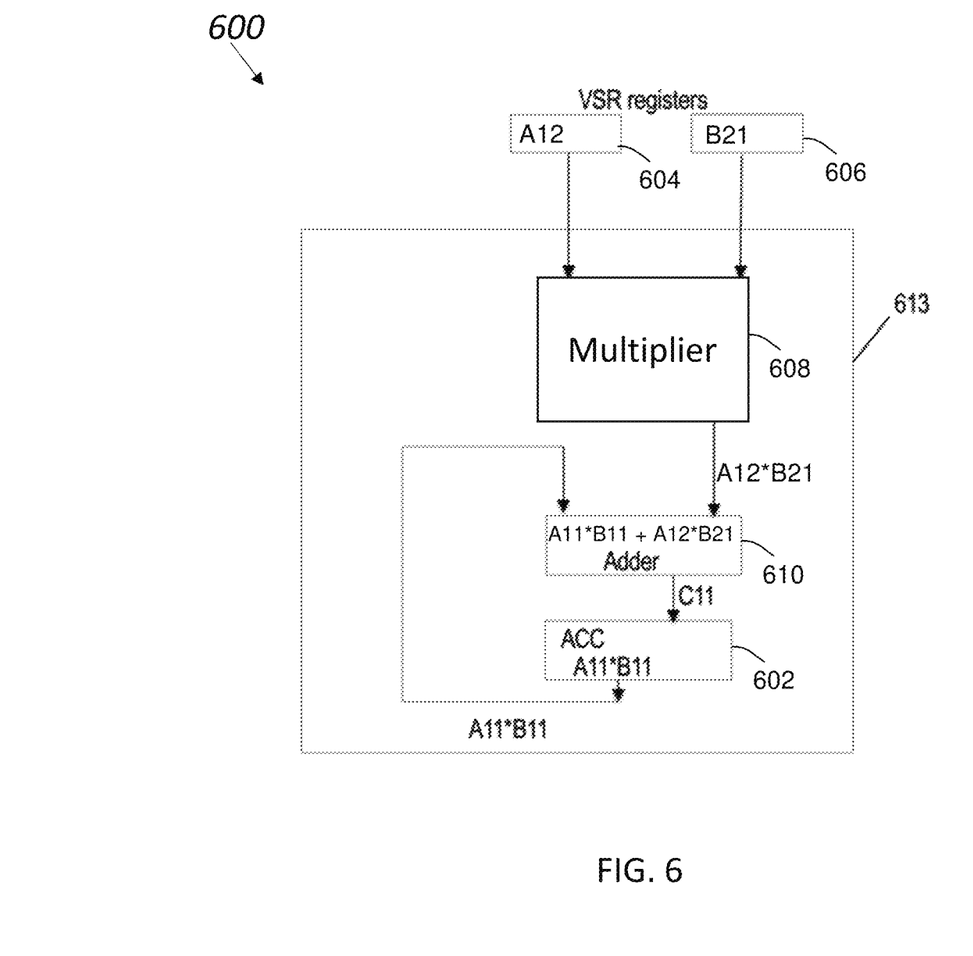
FIG. 6 is a block diagram illustrating multiply-and-accumulate operation support in a compute element according to a non-limiting embodiment.

For simplicity of the following description, the set of MAC operations in FIG. 6 may comprise (but is not limited to) MAC operations for determining a matrix element equal to A11*B11+A12*B21 as an example computation performed by compute element 613, which is a more detailed example of compute elements 302, 400. For enabling the execution of the set of MAC operations, a stream of two instructions may be generated, where each of the instructions may enable performing a MAC operation of the set of MAC operations. An accumulator 602 of the compute element 613 is initialized. The accumulator 602 of compute element 613 may be initialized to zero. The accumulator 602 may be part of a register file.

Inputs may reference two vector scalar (VSR) registers as source registers 604, 606. An instruction further may reference the accumulator 602 as a source and target register of the instruction. Source registers 604, 606 may include the values to be multiplied A11 and B11, and the accumulator 602 can store an initial value. The values A11 and B11 may, for example, be stored in VSR registers of the register file 119 by the load/store unit 117 of FIG. 1 for enabling the execution of the instruction.

The values A11 and B11 may be received at a multiplier 608 of the compute element 613. The multiplier 608 may multiply the values A11 and B11 and provide the result of the multiplication of A11*B11 to an adder 610 of the compute element 613.

The adder 610 may read a current content of the accumulator 602, which may be zero initially. The adder 610 may add the content of the accumulator 602 to the result of the multiplication of A11 and B11. The result of the addition (e.g., A11*B11+0) may be written to the accumulator 602.

A next instruction of an instruction stream may be executed by repeating the process. The status of the compute element 613 can be further updated for the execution of the second instruction. The source registers 604, 606 may include the values to be multiplied as A12 and B21, and the accumulator 602 may store the value A11*B11 from the previous instruction. The adder 610 can receive the current value of the accumulator 602 to sum with the output of the multiplier 608 (e.g., A11*B11+A12*B21). The process can be continued for larger matrices.

Figure 7:
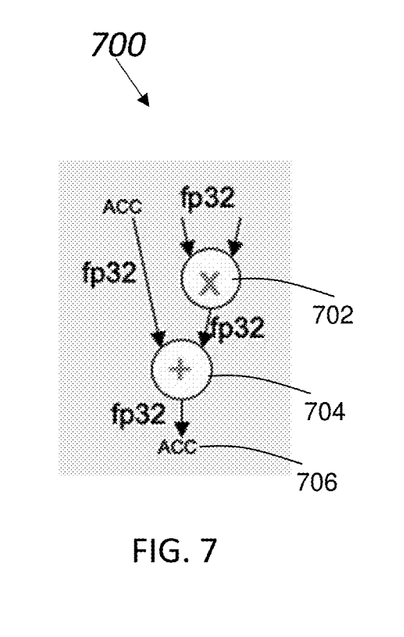
FIG. 7 is a block diagram illustrating multiply-and-accumulate operation support for single-precision computations according to a non-limiting embodiment.
Figure 8:
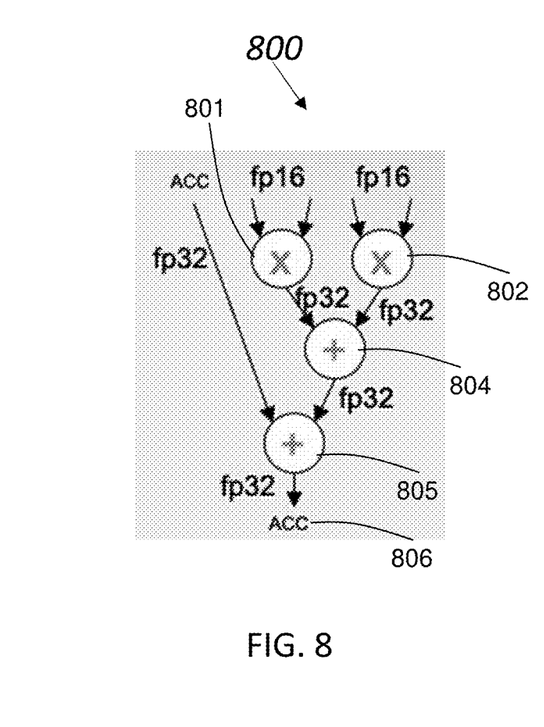
FIG. 8 is a block diagram illustrating multiply-and-accumulate operation support for mixed-precision computations according to a non-limiting embodiment.

FIGS. 7 and 8 depict block diagrams 700 and 800 that further illustrate how different precision inputs can be processed, where block diagram 700 illustrates an example of compute element 400 of FIG. 4 for same-precision processing and block diagram 800 illustrates an example of compute element 500 of FIG. 5 for mixed-precision processing. The block diagrams 700, 800 can employ a similar format as compute element 613 of FIG. 6 and support differing numbers of elements. In FIG. 7, a single multiplier 702 can receive two 32-bit inputs and provide a 32-bit (or larger) output to an adder 704. The adder 704 also receives a 32-bit value from an accumulator 706 and outputs a 32-bit result to the accumulator 706. In contrast, in block diagram 800, the inputs are four 16-bit values, where a first pair of 16-bit values are multiplied by a first multiplier 801 to produce a first 32-bit (or larger) result, and a second pair of 16-bit values are multiplied by a second multiplier 802 to produce a second 32-bit (or larger) result. The two 32-bit (or larger) multiplication results can be added at a first adder 804 with a 32-bit sum provided to a second adder 805 to add with a 32-bit value of an accumulator 806, where the output of the second adder 805 is used to update the accumulator 806 with a 32-bit value. Therefore, mixed precision inputs with respect to outputs can be processed as illustrated in the example of block diagram 800. The use of more multipliers and adders can support further reductions in input precision with more multiplication and addition operations performed per compute element.

Figure 9:
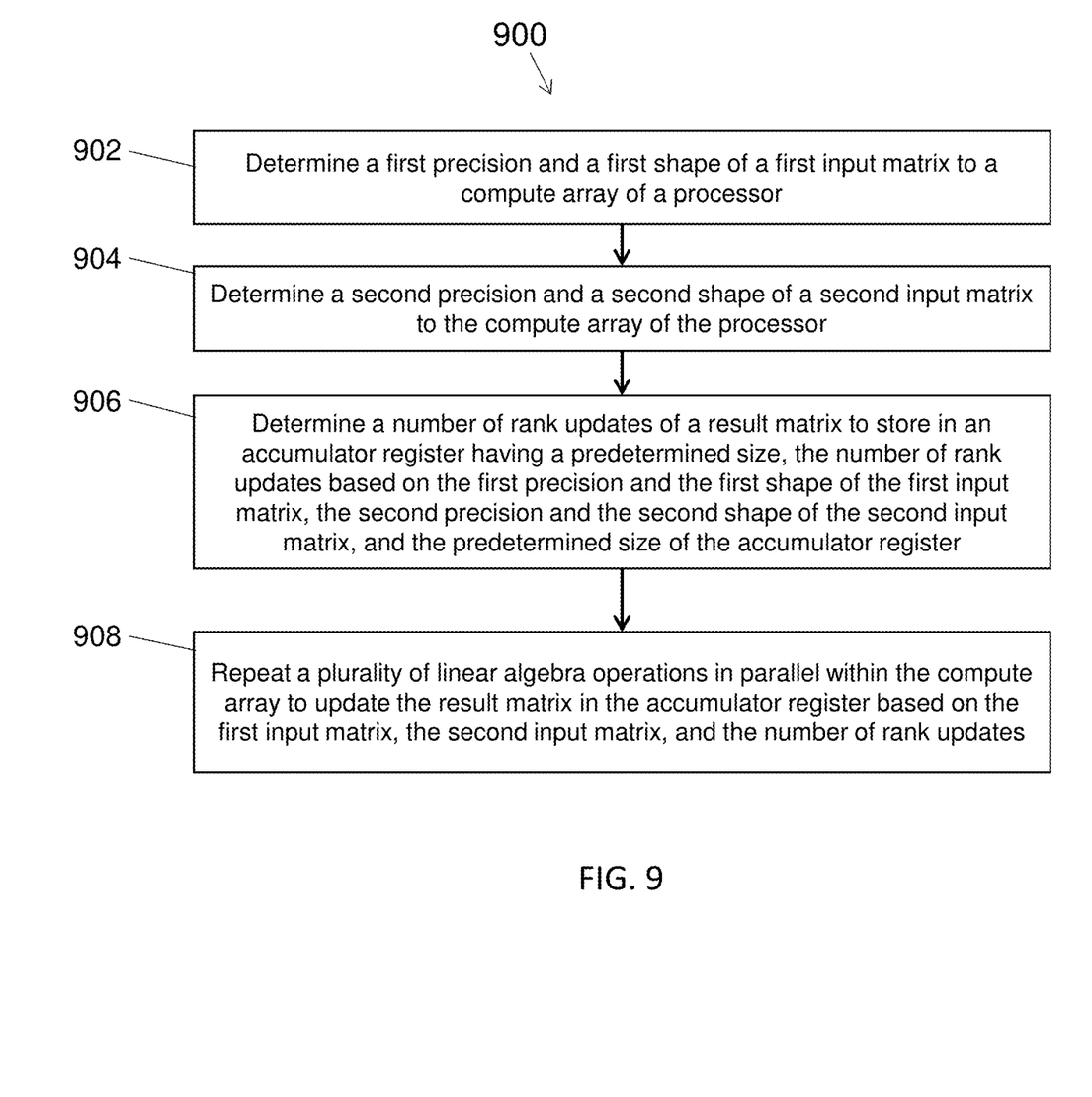
FIG. 9 is a flow diagram illustrating a method according to a non-limiting embodiment.

Turning now to FIG. 9, a flow diagram of a process 900 is generally shown in accordance with an embodiment. The process 900 is described with reference to FIGS. 1-9 and may include additional steps beyond those depicted in FIG. 9. The process 900 can be performed by the processor 101 of the processing system 100 of FIG. 1 as a compute-implemented method. Hardware structures within the processor 101 can enable the performance of the process 900.

At block 902, the processor 101 can determine a first precision and a first shape of a first input matrix 201 to a compute array 300 of the processor 101. The precision can be a bit width (e.g., 32, 16, 8, or 4 bits per element) and format (e.g., floating-point or fixed-point format). The shape can define matrix dimensions in terms of rows and columns.

At block 904, the processor 101 can determine a second precision and a second shape of a second input matrix 203 to the compute array 300 of the processor 101. The compute array 300 can include a first plurality of lanes of compute elements 302 (e.g., four rows) and a second plurality of lanes of compute elements 302 (e.g., four columns) forming a two-dimensional grid structure of rows and columns as illustrated in the example of FIG. 3.

At block 906, the processor 101 can determine a number of rank updates of a result matrix 205 to store in an accumulator register 306 having a predetermined size. The number of rank updates is based on the first precision and the first shape of the first input matrix 201, the second precision and the second shape of the second input matrix 203, and the predetermined size of the accumulator register 306. For example, if the first precision and the second precision are 32-bits, the first shape and the second shape are 4×4, and the accumulator register 306 is 512-bit, it may take four updates or repetitions of the fundamental operation of 4×1 multiplied and accumulated with 1×4 elements to reach a result of 4×4. However, if the first and second input precision are reduced to 16-bits, then each compute element 302 of the compute array 300 can be configured to perform a fundamental operation of 4×2 multiplied and accumulated with 2×4 elements to reach a result of 4×4 in half as many rank updates (e.g., two versus four repetitions).

At block 908, the processor 101 can repeat a plurality of linear algebra operations in parallel within the compute array 300 to update the result matrix 205 in the accumulator register 306 based on the first input matrix 201, the second input matrix 203, and the number of rank updates.

In exemplary embodiments, a first plurality of bit fields of the first input matrix 201 can be routed to the first plurality of lanes of compute elements 302 and the second plurality of lanes of compute elements 302 based on the first precision and the first shape of the first input matrix 201, and a second plurality of bit fields of the second input matrix 203 can be routed to the first plurality of lanes of compute elements 302 and the second plurality of lanes of compute elements 302 based on the second precision and the second shape of the second input matrix 203. For example, the first operand 308 and the second operand 310 may each be 128 bits, which can be four 32-bit values, eight 16-bit values, sixteen 8-bit values, or thirty-two 4-bit values. The number of compute elements 302 can remain fixed with a greater number of lower precision values processed by each compute element 302 as the precision is reduced. For instance, each compute element 302 can receive two bit field inputs of 32-bits each, four bit field inputs of 16-bits each, eight bit field inputs of 8-bits each, or sixteen bit field inputs of 4-bits each. Routing of the first plurality of bit fields of the first input matrix 201 and the second plurality of bit fields of the second input matrix 203 can determined based on instruction decoding by an instruction fetch/decode unit 109 of the processor 101. Each of the compute elements 302 can include at least one multiplier 608 and at least one adder 610. The accumulator 602 can be stored external of the compute elements 302, such as accumulator register 306. Further, in some embodiments, the adder 610 can be distributed across the compute elements 302 as adder 304.

In exemplary embodiments, the first precision and the second precision can differ from a result precision of the result matrix 205 in the accumulator register 306. For instance, 16-bit, 8-bit, and 4-bit inputs can be used to produce 32-bit values in the result matrix 205. Further, a first number of bits of the first input matrix 201 can remain constant as the first precision and the first shape of the first input matrix 201 are changed in one or more subsequent linear algebra operation instructions for the compute array 300, and a second number of bits of the second input matrix 203 can remain constant as the second precision and the second shape of the second input matrix 203 are changed in the one or more subsequent linear algebra operation instructions for the compute array 300. In other words, as the precision is reduced, the shape can grow within the same number of bits. For example, a 4×1 matrix of 32-bit elements may be substituted with a 4×2 matrix of 16-bit elements, a 4×4 matrix of 8-bit elements, or a 4×8 matrix of 4-bit elements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processor, a first precision and a first shape of a first input matrix to a compute array of the processor, wherein the processor comprises an instruction fetch/decode unit operable to fetch and decode a plurality of instructions comprising at least one instruction to perform a plurality of linear algebra operations, a dispatch/issue unit operable to dispatch the instructions to an issue queue after decoding, and the compute array is associated with the issue queue;
   determining, by the processor, a second precision and a second shape of a second input matrix to the compute array of the processor; and
   repeating a plurality of linear algebra operations in parallel within the compute array to update a result matrix in an accumulator register based on the first input matrix, the second input matrix, and a number of rank updates of the result matrix to store in the accumulator register.

2. The computer-implemented method of claim 1, wherein the compute array comprises a first plurality of lanes of compute elements and a second plurality of lanes of compute elements forming a two-dimensional grid structure.

3. The computer-implemented method of claim 2, wherein a first plurality of bit fields of the first input matrix is routed to the first plurality of lanes of compute elements and the second plurality of lanes of compute elements based on the first precision and the first shape of the first input matrix, and a second plurality of bit fields of the second input matrix is routed to the first plurality of lanes of compute elements and the second plurality of lanes of compute elements based on the second precision and the second shape of the second input matrix.

4. The computer-implemented method of claim 3, wherein routing of the first plurality of bit fields of the first input matrix and the second plurality of bit fields of the second input matrix is determined based on instruction decoding by an instruction fetch/decode unit of the processor.

5. The computer-implemented method of claim 2, wherein each of the compute elements comprises at least one multiplier and at least one accumulator.

6. The computer-implemented method of claim 1, wherein the first precision and the second precision differ from a result precision of the result matrix in the accumulator register.

7. The computer-implemented method of claim 1, wherein a first number of bits of the first input matrix remains constant as the first precision and the first shape of the first input matrix are changed in one or more subsequent linear algebra operation instructions for the compute array, and a second number of bits of the second input matrix remains constant as the second precision and the second shape of the second input matrix are changed in the one or more subsequent linear algebra operation instructions for the compute array.

8. A processing system comprising:
   an instruction fetch/decode unit operable to fetch and decode a plurality of instructions comprising at least one instruction to perform a plurality of linear algebra operations;
   a dispatch/issue unit operable to dispatch the instructions to an issue queue after decoding; and
   a compute array associated with the issue queue and configured to perform a plurality of operations comprising:
      determining a first precision and a first shape of a first input matrix;
      determining a second precision and a second shape of a second input matrix; and
      repeating the plurality of linear algebra operations in parallel within the compute array to update a result matrix in an accumulator register based on the first input matrix, the second input matrix, and a number of rank updates of the result matrix to store in the accumulator register.

9. The processing system of claim 8, wherein the compute array comprises a first plurality of lanes of compute elements and a second plurality of lanes of compute elements forming a two-dimensional grid structure.

10. The processing system of claim 9, wherein a first plurality of bit fields of the first input matrix is routed to the first plurality of lanes of compute elements and the second plurality of lanes of compute elements based on the first precision and the first shape of the first input matrix, and a second plurality of bit fields of the second input matrix is routed to the first plurality of lanes of compute elements and the second plurality of lanes of compute elements based on the second precision and the second shape of the second input matrix.

11. The processing system of claim 10, wherein routing of the first plurality of bit fields of the first input matrix and the second plurality of bit fields of the second input matrix is determined based on instruction decoding by the instruction fetch/decode unit.

12. The processing system of claim 9, wherein each of the compute elements comprises at least one multiplier and at least one accumulator.

13. The processing system of claim 8, wherein the first precision and the second precision differ from a result precision of the result matrix in the accumulator register.

14. The processing system of claim 8, wherein a first number of bits of the first input matrix remains constant as the first precision and the first shape of the first input matrix are changed in one or more subsequent linear algebra operation instructions for the compute array, and a second number of bits of the second input matrix remains constant as the second precision and the second shape of the second input matrix are changed in the one or more subsequent linear algebra operation instructions for the compute array.

15. A computer program product comprising a computer readable storage medium having program instructions embodied therewith, the program instructions executable by processing circuitry of a processor to perform a plurality of operations comprising:
   determining, by the processor, a first precision and a first shape of a first input matrix to a compute array of the processor, wherein the processor comprises an instruction fetch/decode unit operable to fetch and decode a plurality of instructions comprising at least one instruction to perform a plurality of linear algebra operations, a dispatch/issue unit operable to dispatch the instructions to an issue queue after decoding, and the compute array is associated with the issue queue;

determining, by the processor, a second precision and a second shape of a second input matrix to the compute array of the processor; and repeating a plurality of linear algebra operations in parallel within the compute array to update a result matrix in an accumulator register based on the first input matrix, the second input matrix, and a number of rank updates of the result matrix to store in the accumulator register.

16. The computer program product of claim 15, wherein the compute array comprises a first plurality of lanes of compute elements and a second plurality of lanes of compute elements forming a two-dimensional grid structure.

17. The computer program product of claim 16, wherein a first plurality of bit fields of the first input matrix is routed to the first plurality of lanes of compute elements and the second plurality of lanes of compute elements based on the first precision and the first shape of the first input matrix, and a second plurality of bit fields of the second input matrix is routed to the first plurality of lanes of compute elements and the second plurality of lanes of compute elements based on the second precision and the second shape of the second input matrix.

18. The computer program product of claim 17, wherein routing of the first plurality of bit fields of the first input matrix and the second plurality of bit fields of the second input matrix is determined based on instruction decoding by an instruction fetch/decode unit of the processor.

19. The computer program product of claim 16, wherein each of the compute elements comprises at least one multiplier and at least one accumulator, and wherein the first precision and the second precision differ from a result precision of the result matrix in the accumulator register.

20. The computer program product of claim 15, wherein a first number of bits of the first input matrix remains constant as the first precision and the first shape of the first input matrix are changed in one or more subsequent linear algebra operation instructions for the compute array, and a second number of bits of the second input matrix remains constant as the second precision and the second shape of the second input matrix are changed in the one or more subsequent linear algebra operation instructions for the compute array.

* * * * *